Sept. 22, 1959     I. B. BENSEN     2,905,410

LANDING GEAR FOR HELICOPTERS

Filed March 8, 1955     2 Sheets-Sheet 1

INVENTOR
IGOR B. BENSEN
BY
ATTORNEY

Sept. 22, 1959 I. B. BENSEN 2,905,410
LANDING GEAR FOR HELICOPTERS
Filed March 8, 1955 2 Sheets-Sheet 2

INVENTOR
IGOR B. BENSEN
BY *James H. Littlepage*
ATTORNEY

United States Patent Office 2,905,410
Patented Sept. 22, 1959

2,905,410
LANDING GEAR FOR HELICOPTERS

Igor B. Bensen, Raleigh, N.C.

Application March 8, 1955, Serial No. 492,873

2 Claims. (Cl. 244—17.17)

This invention relates to landing gear for helicopters, autogyros and the like rotative wing aircraft and, more particularly, to landing gear adjustable to various positions under direct control of the pilot's feet.

In one embodiment of the invention, the object is to provide a landing gear unit pivoted intermediate its front and rear ends to the main frame of the aircraft so that a pilot seated in the main frame may push downwardly with his feet while jumping the craft off the ground and, in landing, may settle the craft onto the ground, by action of his leg muscles, in bringing the craft to the desired attitude of rest.

A further object is the provision of an adjustable landing gear wherein laterally spaced ground-engaging members are under direct control of the pilot's feet so that the vertical motions of the landing gear are coordinated directly with corresponding pedal motions of the pilot. When the pilot senses that he is about to bump down to a hard landing he can stiffen the muscles of both legs so as to reinforce the spring supports for the landing gear and, in take off, the pilot may push downwardly with his feet.

These and other objects will be apparent from the following specification and drawings, in which:

Fig. 3 is a detailed sectional view of the resilient supporting and locking member used in both forms of the invention.

Figure 1:
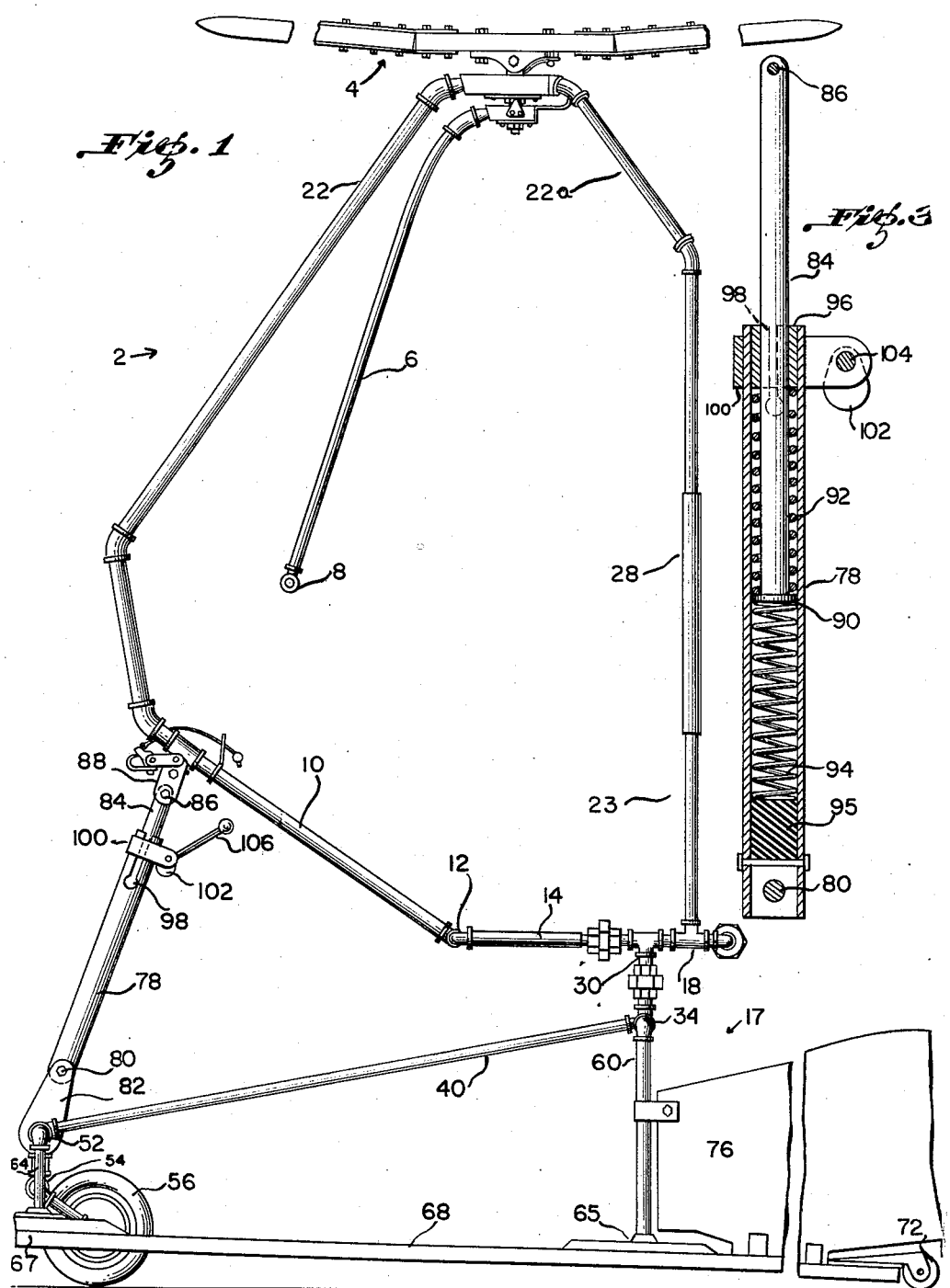
Fig. 1 is a side elevation of a helicopter glider embodying one form of the invention.
Figure 2:
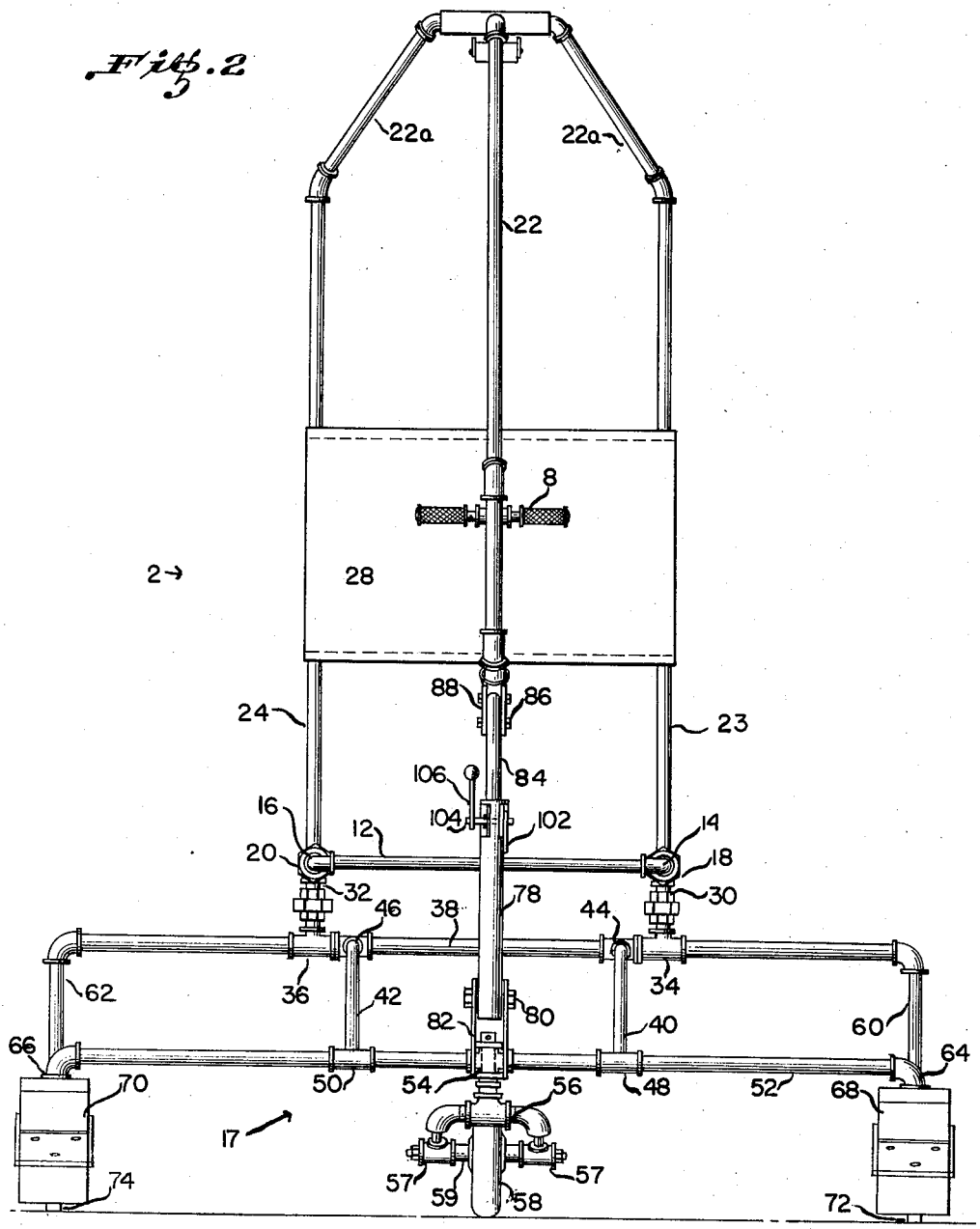
Fig. 2 is a front elevation of the helicopter glider shown in Fig. 1; with rotor removed.

Referring now to the drawings in which like reference numerals denote similar elements the invention is illustrated as the landing gear for a gyro-glider, it being understood that the invention has utility for other craft, such as powered helicopters and the like rotary wing aircraft, and other aircraft where the problems of landing on sloping ground are encountered. Referring particularly to Figs. 1 and 2, the main frame indicated generally at 2 is of elementary form consisting of front and rear members 22, 22a converging at their upper ends to support a rotor 4 controlled by a control stick 6, the handle 8 of which is in front of the pilot station. The front bar 10 of the main frame is connected to a cross-bar 12 and rearwardly extending seat side bars 14, 16 are jointed at 18 and 20, respectively, to the rear frame bars 23 and 24. Seat straps, not shown, extending between seat side bars 14 and 16 support the pilot while a seat back 28 stretched between frame bars 23 and 24 provides a back rest. Downward extensions 30, 32 connected to the seat frame bars 14, 16 are pivotally connected to the landing gear, denoted generally at 17, as detailed hereinafter.

Downward extensions 30, 32 have at their lower ends T joints 34, 36 in which is rotatably mounted a rear cross bar 38. The supporting framework for the landing gear further includes fore-and-aft frame bars 40, 42 connected by T joints 44, 46 to rear cross bar 38 and, by T joints 48, 50, to a front cross bar 52. Mounted at the middle of cross front bar 52 is a caster bearing 54 swivelly supporting the caster arms 56 which bracket a nose wheel 58. Rear posts 60 and 62 extend downwardly from the ends of rear cross bar 38, and front posts 64, 66 extend downwardly from the ends of front cross bar 52, these posts being connected at their lower ends, as indicated at 65, 67, to skids ground engaging means 68 and 70 which extend longitudinally of the landing gear on each side thereof. Small wheels or rollers 72, 74 are mounted on the rear ends of the skids for rollably supporting the rear ends of the skids on the ground and, as will be seen in Fig. 1, fins 76 are connected between the skids and rear posts 60, 62 for stabilizing the craft in flight.

It will be apparent that the landing gear, as a whole, is pivotally mounted adjacent the lower rear portion of main frame 2, so that the front end of the landing gear may be pivoted upwardly and downwardly about the axis of T joints 34, 36 in which rear tube 38 is rotatably mounted. The front end of landing gear 17 is spring-supported on the front portion of the main frame 2 by means of an extensible brace, i.e., a shock absorber. The shock absorber casing 78 is pivoted at 80 to a bracket 82 connected to front bar 52 adjacent the mounting of caster 56. The shock absorber piston rod 84 is connected at 86 to a bracket 88, the latter being connected to front bar 10 of main frame 2. The piston rod normally floats in a central position, its piston 90 floating between compression springs 92 and 94. Compression spring 94 bottoms on the rubber stop 95 in the lower end of shock absorber casing 78 and the upper end of spring 92 abuts against a split sleeve 96 affixed within the upper end of shock absorber casing 78, the casing being split as denoted at 98. A clamp collar 100 engaged around the split upper end of shock absorber 78 may be clamped so as to compress the split upper end of the shock absorber casing by means of a cam 102 and a cam shaft 104. The handle 106 on cam shaft 104 is arranged so that when the handle is swung, cam 102 squeezes together the free ends of clamp collar 100 and thus clamps piston rod 84 so as to prevent it from sliding.

In taking off, the craft is towed along the ground and the pilot, with his feet resting against front cross bar 52, moves handle 106 so as to free piston rod 84 and, by pushing downwardly with his legs, can jump the craft off the ground as the craft is about to become airborne. In rotary wing aircraft, a "jump off" can be obtained by sudden increase in either the collective pitch or rearward tilt of the cyclic pitch. Springs 92 and 94 normally center the shock absorber assembly but by manipulating the landing gear with his feet, the pilot may bring it to the desired angular position with respect to the main frame and clamp it there by moving handle 106 to a clamping position. In landing, the pilot releases the handle 106 from clamping position and normally lands with the main frame tipped somewhat rearwardly, with the landing gear front portion extending downwardly. As he comes into the landing, the pilot settles the craft downwardly and allows the front end of the landing gear to pivot upwardly as the craft levels and he then locks it by swinging handle 106 to locking position. Landing on forwardly or rearwardly sloping terrain may thus be accomplished and by leg manipulation of the landing gear and by locking it in the desired position, the pilot may thus maintain the main frame level, even though the landing gear is not appropriately slanted for the slope.

The skids stabilize the craft against lateral tipping, and lend additional support for the wheels on soft surfaces. When operated as a gyro-glider, the pilot may steer the craft along the ground by placing his feet on bearings 57 which rotatably support the nose wheel axle 59.

The invention is not limited to the details described and illustrated hereinbefore, but is intended to cover all substituting, modifications, and equivalents within the scope of the following claims.

I claim:

1. In a rotating wing craft, a main frame having front and rear portions and a pilot station, landing gear comprising a pair of skids disposed below said main frame and one on each side thereof, said skids extending substantially fore-and-aft of said main frame and having front and rear ends, a supporting framework for said skids, said framework having forward and rear portions, means pivotally mounting the rear portion of framework on the rear portion of said main frame, whereby the front ends of said skids may be swung upwardly and downwardly at the front end of said main frame, said framework including a cross bar extending substantially transversely thereof and connected at its opposite ends to said skids, and an extensible brace connected between the front portion of said main frame and the forward portion of said framework.

2. In the combination claimed in claim 1, wheels rollably supporting the rear ends of said skids on the ground, and a nose wheel rollably supporting the forward portion of said framework on the ground.

References Cited in the file of this patent

UNITED STATES PATENTS

| | | |
|---|---|---|
| 975,403 | Dunne | Nov. 15, 1910 |
| 1,068,311 | Burga | July 22, 1913 |
| 1,818,417 | Milburn | Aug. 11, 1931 |
| 2,260,290 | Brie | Oct. 28, 1941 |
| 2,515,380 | Pentecost | July 18, 1950 |
| 2,630,989 | Sikorsky | Mar. 10, 1953 |
| 2,702,171 | Katzenberger | Feb. 15, 1955 |

FOREIGN PATENTS

| | | |
|---|---|---|
| 447,816 | France | Nov. 8, 1912 |
| 25,663 | Great Britain | Nov. 3, 1910 |

OTHER REFERENCES

"Flight," Dec. 18, 1953, page 815.
"American Helicopter," vol. 29, issue 1, December 1952, page 11.